United States Patent
Füßl et al.

(10) Patent No.: US 10,065,678 B2
(45) Date of Patent: Sep. 4, 2018

(54) METHOD AND DEVICE FOR DETERMINING AN ANGLE OF ROTATION AND/OR A ROTATIONAL SPEED OF A STEERING SHAFT

(71) Applicant: ZF Friedrichshafen AG, Friedrichshafen (DE)

(72) Inventors: Andreas Füßl, Kressbronn am Bodensee (DE); Notker Amann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 19 days.

(21) Appl. No.: 15/100,673

(22) PCT Filed: Nov. 11, 2014

(86) PCT No.: PCT/EP2014/074214
§ 371 (c)(1),
(2) Date: Jun. 1, 2016

(87) PCT Pub. No.: WO2015/086235
PCT Pub. Date: Jun. 18, 2015

(65) Prior Publication Data
US 2016/0304125 A1  Oct. 20, 2016

(30) Foreign Application Priority Data
Dec. 13, 2013  (DE) .......... 10 2013 225 877

(51) Int. Cl.
*B62D 5/04* (2006.01)
*B62D 15/02* (2006.01)
(Continued)

(52) U.S. Cl.
CPC ......... *B62D 15/0225* (2013.01); *B62D 5/046* (2013.01); *G01P 3/00* (2013.01); *G01P 3/44* (2013.01)

(58) Field of Classification Search
CPC ....... B62D 15/0225; B62D 5/046; G01P 3/00; G01P 3/44
See application file for complete search history.

(56) References Cited

U.S. PATENT DOCUMENTS 4,860,844 A * 8/1989 O'Neil ................. B62D 5/003
                                                                180/402
6,169,345 B1 * 1/2001 Bloch ................. B62D 5/0406
                                                                310/160
(Continued)

FOREIGN PATENT DOCUMENTS

DE  39 07 442 A1  9/1990
DE  103 09 060 A1  9/2004
(Continued)

OTHER PUBLICATIONS

German Search Report Corresponding to 10 2013 225 877.1 dated Jun. 5, 2014.
(Continued)

*Primary Examiner* — Jacob D Knutson
*Assistant Examiner* — Marlon A Arce
(74) *Attorney, Agent, or Firm* — Davis & Bujold PLLC; Michael J. Bujold

(57) ABSTRACT

A method of determining an angle of rotation and/or a rotational speed of a motor shaft (110) of a motor (105) which is designed to produce a translational movement of a control element (115, 115a) relative to the motor (105). The method includes a step of reading in a movement signal via an interface with at least one sensor element (120) arranged outside the motor (105) such that the movement signal represents a translational movement of the control element (Continued)

(115) relative to the motor. In addition, the method further includes a step in which, using the movement signal, the angle of rotation and/or the rotational speed of the motor shaft (110) is/are determined.

9 Claims, 3 Drawing Sheets

(51) Int. Cl.
    *G01P 3/44* (2006.01)
    *G01P 3/00* (2006.01)

(56) References Cited

U.S. PATENT DOCUMENTS

| | | | |
|---|---|---|---|
| 6,246,232 B1 | 6/2001 | Okumura | |
| 6,301,534 B1* | 10/2001 | McDermott, Jr. | B62D 5/001 |
| | | | 701/41 |
| 6,791,219 B1* | 9/2004 | Eric | H02K 29/08 |
| | | | 310/68 B |
| 7,213,341 B2 | 5/2007 | Staudt et al. | |
| 8,004,277 B2 | 8/2011 | Patil et al. | |
| 8,239,098 B2 | 8/2012 | Kramer et al. | |
| 2002/0097044 A1 | 7/2002 | Tateishi et al. | |
| 2008/0011539 A1 | 1/2008 | Riepold et al. | |
| 2011/0185801 A1* | 8/2011 | Johannsen | G01P 1/026 |
| | | | 73/115.08 |
| 2017/0023445 A1* | 1/2017 | Bourdrez | B62D 5/0463 |

FOREIGN PATENT DOCUMENTS

| | | |
|---|---|---|
| DE | 20 2004 014 849 U1 | 3/2005 |
| DE | 103 48 914 A1 | 6/2005 |
| DE | 10 2010 052 917 A1 | 5/2012 |
| DE | 10 2012 202 639 A1 | 8/2013 |
| DE | 10 2012 202 662 A1 | 8/2013 |
| EP | 2 100 798 A2 | 9/2009 |

OTHER PUBLICATIONS

International Search Report Corresponding to PCT/EP2014/074214 dated May 11, 2015.
Written Opinion Corresponding to PCT/EP2014/074214 dated May 11, 2015.

* cited by examiner

METHOD AND DEVICE FOR DETERMINING AN ANGLE OF ROTATION AND/OR A ROTATIONAL SPEED OF A STEERING SHAFT

This application is a National Stage completion of PCT/EP2014/074214 filed Nov. 11, 2014, which claims priority from German patent application serial no. 10 2013 225 877.1 filed Dec. 13, 2013.

FIELD OF THE INVENTION

The present invention relates to a method for determining an angle of rotation and/or a rotational speed of a motor shaft of a motor, to a corresponding device, to a steering mechanism of a vehicle and to a corresponding computer program product.

BACKGROUND OF THE INVENTION

Rear axle steering systems which are mass-produced or are in development for mass production can comprise a control element, for example a variable-length control arm, in particular a transverse control arm, which is driven by means of a motor. To control the motor, as a rule a rotor position sensor is needed. In addition, in such a control system an absolute position sensor can be incorporated, which is designed to determine a translational or axial movement of the control element. To control the motor, a current motor position and also a current motor rotational speed are usually required. These two parameters are determined, for example, by means of a motor position sensor attached on a motor shaft.

DE 10 2010 052 917 A1 discloses a control element for a steering mechanism of a motor vehicle.

SUMMARY OF THE INVENTION

Against this background the approach proposed here provides an improved method for determining an angle of rotation and/or a rotational speed of a motor shaft of a motor, a corresponding device, a steering mechanism of a vehicle and, finally, a corresponding computer program product, according to the principal claims. Advantageous design features emerge from the subordinate claims and the description given below.

The present approach provides a method for determining an angle of rotation and/or a rotational speed of a motor shaft of a motor, the motor being designed to move a control element in translation relative to the motor. The method comprises the following steps:

reading in of a movement signal via an interface, from at least one sensor element arranged outside the motor, such that the movement signal represents a translational movement of the control element relative to the motor; and determination of the angle of rotation and/or the rotational speed of the motor shaft, using the movement signal.

An angle of rotation can be understood to mean a rotation of the motor shaft about a longitudinal axis of the motor shaft. A rotational speed can be understood to mean a number of rotations of the motor shaft about the longitudinal axis of the motor shaft during a specified time. A motor shaft can be understood to mean an element of a motor which is designed to be set into rotational movement when the motor is operated. A motor can be understood to mean a machine for performing mechanical work. For example, the motor can be an electric motor. The motor shaft can be mechanically coupled to a control element. A control element can be understood to mean a machine element designed to be moved in translation relative to the motor when the motor is operated. For example, the control element can be a lever or a rod arranged so that it can move along the motor shaft and which is coupled to the motor shaft for example by means of a ball screw, a trapezoidal spindle and a rotary spindle. In particular, the control element is contained in or forms a control arm, especially a transverse control arm for a motor vehicle, in order to vary the length of the control arm. If the control arm is fixed to the vehicle body on one side and connected to at least one wheel carrier on the other side, then by varying its length a steering movement of the wheel carrier can be produced. For this, the wheel carrier is articulated on the vehicle so that it can rotate about the vertical axis. Translational movement of the control element can be understood to mean movement during which all points of the control element are displaced in the same direction relative to the motor. Outside the motor at least one sensor element can be arranged in order to detect the translational movement. For example, the sensor element can be attached to the control element. A sensor element can be for example be understood to be a path sensor. The sensor element can be designed to detect the translational movement on the basis of an electrical resistance change, a variable inductance, a variable capacity, a variable luminous flux, a count of pulses and/or a running-time measurement.

The above approach is based on the recognition that a motor position sensor attached to a motor shaft for detecting an angle of rotation or rotational speed of the motor shaft, can be dispensed with. By virtue of a method to be described below, the two signals needed for regulating a motor, namely the angle of rotation and the rotational speed, can be provided cost-effectively and in a space-saving manner despite the missing motor position sensor, in order to be able to regulate operation of the motor correctly and dynamically.

In an embodiment of the present approach, during the determination step a speed of the translational movement is determined using the movement signal, in order to determine the rotational speed. For that purpose, for example, the speed can be determined by derivation. Using the speed of the translational movement, the rotational speed of the motor shaft can be determined sufficiently reliably and accurately.

Furthermore, during the determination step, the angle of rotation and/or the rotational speed can be determined by using a movement equation and/or by taking into account a transmission ratio of a mechanical transmission chain between the motor and the control element. In a general sense a movement equation can be understood to mean a differential equation of the second order or even a system of differential equations of the second order. By means of the movement equation, a development of a mechanical system in space and time under the effect of external influences can be described. The mechanical transmission chain can for example comprise a transmission, a belt drive and/or a threaded spindle. By means of the mechanical transmission chain, rotational movement of the motor shaft can be transformed into translational movement, in particular of a threaded spindle. The mechanical transmission chain can be made with a predetermined transmission ratio. This embodiment of the present approach ensures a correct determination of the angle of rotation and/or the rotational speed.

By virtue of the mechanical coupling between the translational and rotational movement by the mechanical transmission elements, using the translational sensor system the angular position or rotation angle of the motor shaft can be deduced with sufficient reliability and accuracy.

Furthermore, during the determination step, the angle of rotation and/or the rotational speed can be determined using a linear conversion, an observer structure and/or a Kalman filter. A linear conversion can for example be understood to mean a linear conversion of the speed of the translational movement into the rotational speed. An observer structure can be understood to mean a system which, from specified input and output magnitudes of an observed reference system, reconstructs non-measurable parameters. The observer structure can for example comprise the Luenberger observer. A Kalman filter system can be understood to mean a filter for the elimination of inaccuracies caused by measuring instruments. By virtue of this embodiment of the present approach, inaccuracies in the determination of the angle of rotation and/or the rotational speed can be avoided.

According to a further embodiment of the present approach, the method can comprise a step in which a motor shaft position is determined when the motor is at rest. In this case, during the determination step the angle of rotation can also be determined using the motor shaft position. By determining the motor shaft position a reference point can be established for the determination of the angle of rotation.

Furthermore, during the determination step the motor can be acted upon by a test signal, in order to determine the motor shaft position. A test signal can be understood to mean an electrical signal such as a voltage signal, which is injected into an electric motor. By means of the test signal a position of a rotor of the electric motor when the rotor is at rest can be detected.

In the determination step the control element can be at least temporarily blocked, in order to prevent control movement.

The method can comprise a step in which a position signal is received, via the interface, by the at least one sensor element. The position signal can represent an absolute position of the control element. In the determination step the motor shaft position can also be checked using the position signal. In this way the reliability when determining the motor shaft position can be increased.

In addition, the present approach provides a device for determining an angle of rotation and/or a rotational speed of a motor shaft of a motor, such that the motor is designed to move a control element in translation relative to the motor, the device having the following features:

a read-in unit for reading in a movement signal by way of an interface with at least one sensor element arranged outside the motor, wherein the movement signal represents a translational movement of the control element relative to the motor; and a determination unit for determining the angle of rotation and/or the rotational speed of the motor shaft, using the movement signal.

A device can be an electrical instrument that processes sensor signals and emits control signals as a function of them. The device can comprise one or more suitable interfaces, which can be in the form of hardware and/or software. For example, in a hardware design the interfaces can be part of an integrated circuit in which functions of the device are implemented. The interfaces can even be separate integrated circuits, or they can consist at least in part of discrete structural elements. In a software design the interfaces can be software modules, for example present in a microcontroller together with other software modules.

Finally the present approach provides a steering mechanism of a vehicle, the steering mechanism having the following features:

a control element for adjusting a steering angle of the vehicle;

a motor, designed to displace the control element in a translational movement relative to the motor, the motor comprising a device according to a previously described embodiment, in order to determine an angle of rotation and/or a rotational speed of a motor shaft of the motor; and at least one sensor element arranged outside the motor, for detecting the translational movement of the control element, such that the at least one sensor element is connected to the device by way of an interface.

A steering mechanism can for example be understood to mean a device for steering a front or rear axle of a vehicle. A vehicle is understood to mean a motor vehicle, in particular a two-track motor vehicle such as a passenger car or a truck.

Also advantageous is a computer program product with a program code, which can be stored on a machine-readable support such as a semiconductor memory, a fixed-disk memory or an optical memory, and is designed to be used for implementing the method according to one of the embodiments described earlier when the program is run on a computer or a device.

BRIEF DESCRIPTION OF THE DRAWINGS

An example of the invention is described in greater detail with reference to the attached drawings, which show.

DETAILED DESCRIPTION OF THE PREFERRED EMBODIMENTS

In the following description of preferred example embodiments of the present invention, the same or similar indexes are used for similarly acting elements shown in the various figures, so that repeated descriptions of those elements are unnecessary.

Figure 1:
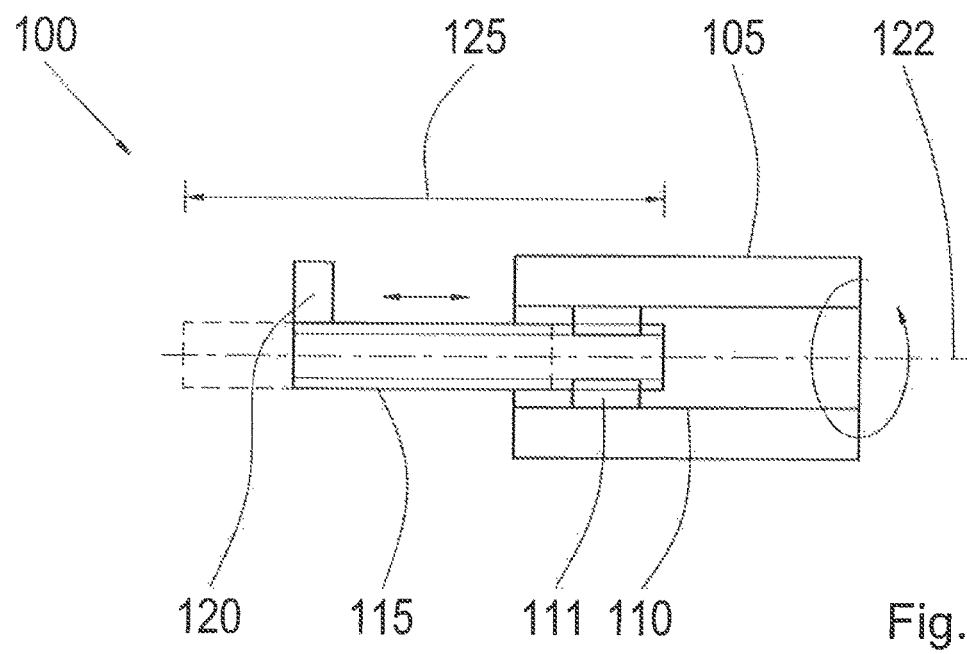
FIG. 1: A schematic representation of a control device for use with a device according to an embodiment of the present invention.

FIG. 1 shows a schematic representation of a control device 100 for use with a device according to an example embodiment of the present invention. The control device 100 comprises a motor 105 with a motor shaft 110, a control element 115 and a sensor 120. The motor 105 is arranged coaxially around the control element 115. The control element 115 is arranged within the motor shaft 110 and can be moved in translation along a longitudinal axis 122 of the motor shaft 110. The sensor 120 is, for example, attached to an end area of the control element 115 located outside the motor 105. Alternatively, the sensor 120 can be attached to a housing of the motor 105 or to a structure of the control device 100 that surrounds the control element 115, such as a housing of the control device.

The motor 105 is designed to cause the motor shaft 110 to rotate about the longitudinal axis 122. For example, the motor 105 is an electric motor and the motor shaft 110 is the rotor shaft of a rotor of the electric motor. The control element 115 is in the form of a threaded spindle, so that by virtue of the rotational movement of the motor shaft 110 it will be moved in translation along the longitudinal axis 122. The motor shaft 110 comprises or drives a spindle nut 111 which meshes with the thread of the threaded spindle 115. The sensor 120 is designed to detect the translational movement of the control element 115 within a control range 125 of the control element 115, and to emit a corresponding movement signal to an interface with a device (not shown in FIG. 1) for determining an angle of rotation and/or a rotational speed of the motor shaft 110.

Figure 2:
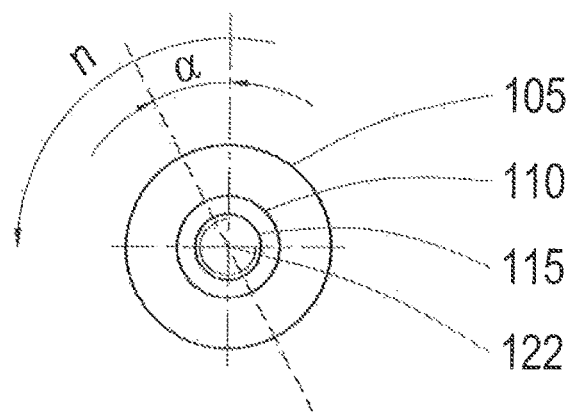
FIG. 2: A schematic representation of a control device for use with a device according to an embodiment of the present invention.

FIG. 2 shows a schematic representation of a control device 100 for use with a device according to an example embodiment of the present invention. In contrast to FIG. 1, FIG. 2 shows a cross-section transverse to the longitudinal axis 122. When the motor 105 is operated, the motor shaft 110 rotates with a speed that depends on the rotational speed n of the motor 105 through an angle of rotation a about the longitudinal axis 122. The rotational speed n and the angle of rotation a can be determined by means of a method described below with reference to FIG. 4, without using a motor-internal sensor.

Figure 3:
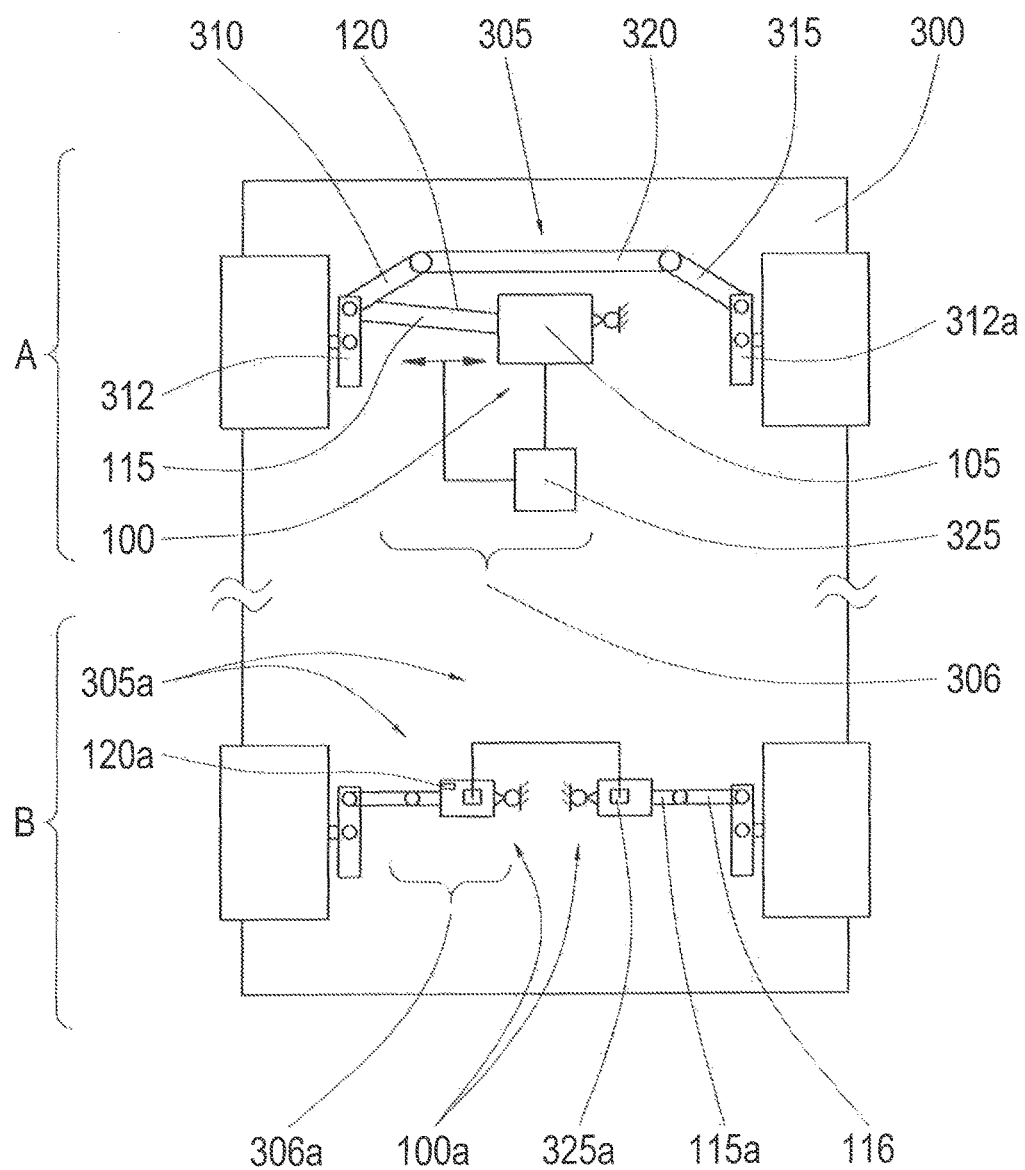
FIG. 3: A schematic representation of a vehicle with steering mechanisms according to example embodiments of the present invention.

FIG. 3 shows a schematic representation of a vehicle 300 with two steering mechanisms 305, 305a according to example embodiments A and B of the present invention. The vehicle 300 is a two-track vehicle. In the vehicle 300 the control device 100, 100a pictured in FIGS. 1 and 2 is incorporated in two different versions. In this case an end area of the control element 115, 115a is fitted movably onto an articulated axle arm 310 of the vehicle 300.

On the side of the vehicle opposite the axle arm 310 is arranged a further axle arm 315. This axle arm 315 is connected movably to the axle arm 310 by way of a transverse link 320. The transverse link 320 is designed such that a steering angle change of the wheel carrier 312 caused by displacing the control element 115 is transmitted to the further axle arm 315 and hence to the other wheel carrier 312a.

The control device 100, 100a comprises a control unit 325, 325a which is connected to the sensor 120 and the motor 105 by way of corresponding interfaces in the vehicle 300. The control unit 325 is designed such that it reads in the movement signal emitted by the sensor 120, 120a, which represents the translational movement of the control element 115, 115a, and, using the movement signal, determines the angle of rotation and/or the rotational speed of the motor shaft of the motor 105.

According to the example embodiments of the present invention, in rear-axle steering applications sensor-free motor control is enabled by replicating a motor rotational speed in the absence of a motor position sensor. In this case a steering mechanism 305 in the form of a rear axle steering control element 306, 306a comprises an absolute position sensor 120, 120a which cooperates with a control element 115. The control element is designed to produce a steering movement at a rear axle of the vehicle 300. The control element 115 is connected to the motor shaft by an interlocking machine element such as a spindle nut 111. As control elements, for example ball screw or ball ramp spindles or trapeze spindles can be used. Alternatively, belt drives or gear drives that serve as coupling elements between the motor shaft and the control element can also be used. In FIG. 3, in version A steering by means of a single control element, the central control element 305 is shown. Version B shows two individual control elements 305a, each with a control unit 325a of its own.

Figure 4:
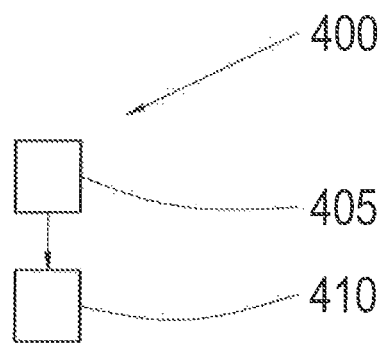
FIG. 4: A sequence diagram for an example embodiment of a method for determining an angle of rotation and/or a rotational speed of a motor shaft of a motor.

FIG. 4 shows a sequence diagram of an example embodiment of a method 400 for determining an angle of rotation and/or a rotational speed of a motor shaft of a motor. The method comprises a step 405 in which a movement signal is read in via an interface with at least one sensor arranged outside the motor, such that the movement signal represents a translational movement of the control element relative to the motor. In addition, the method comprises a step 410 in which the angle of rotation and/or the rotational speed of the motor shaft is/are determined using the movement signal.

The sensor 120, 120a shown in FIGS. 1 and 3 is designed, for example, to work or detect over the entire control range 125. In this, an absolute position detection is not absolutely necessary. For example, a relative detection is sufficient for a speed determination. From the translational movement detected, a linear travel speed is determined, for example by derivation. As shown in FIG. 2, this is converted into an equivalent motor rotational speed by taking into account a movement equation and the characteristics of a mechanical transmission chain. A calculation can be done by way of a linear conversion, an observer structure or a Kalman filter. Alternatively to the rear axle steering, the detection of the linear control movement by a control element can also be used in a vehicle transmission. For example, in an automatic transmission the control element can engage a gear or actuate a selector lever. In the case of the transmission control the position of the control element is supplied.

According to a further example embodiment of the present invention, the sensor-free motor control can also take place by means of position replication. In this case an estimate of the motor rotational speed n is combined with an estimate of a motor rotation angle α.

If a control device 100, 100a has been initialized, then by an injection method a position of a rotor of an electric motor 105 is determined. Injection methods are methods with active current imposition. In this, the motor 105 is acted upon with a test signal in order to determine the position of the rotor at rest.

This takes place optionally in a condition in which the control device 100 is blocked by a locking device so that no control movement can take place.

To determine the motor shaft position, in addition the position determined by the injection method is compared with and checked against position information from the absolute translational position sensor 120.

In this case the absolute position sensor 120 detects a translational movement or an absolute linear position. From that movement or position, taking into account the movement equation and the characteristics of the mechanical transmission chain an equivalent rotational motor position α is calculated.

As in the case of the rotational speed replication, the calculation can be done by way of a linear conversion, an observer structure or a Kalman filter.

The method described here can be applied in general with electric control devices 100, 100a which comprise a translational movement device 115 with a sensor 120, 120a for detecting a position of the movement device 115, wherein the movement device 115 is connected to a motor 105 by means of a transmission, a mechanical coupling or otherwise.

Figure 5:
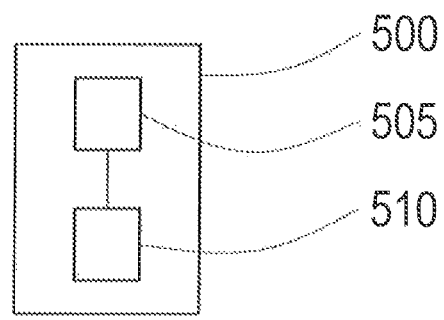
FIG. 5: A block circuit diagram of an example embodiment of a device for determining an angle of rotation and/or a rotational speed of a motor shaft of a motor.

FIG. 5 shows a block diagram of an example embodiment of a device 500 for determining an angle of rotation and/or a rotational speed of a motor shaft of a motor. The device 500 is, for example, the control unit 325, 325a shown in FIG. 3. The device 500 comprises a read-in unit 505 for reading in a movement signal via an interface to at least one sensor arranged outside the motor, such that the movement signal represents a translational movement of the control element 115 relative to the motor. To the read-in unit is connected a determination unit 510. The determination unit 510 is designed to determine the angle of rotation and/or the rotational speed of the motor shaft using the movement signal.

The determination unit 510 can be connected to an optional control unit of the device 500. The control unit can be designed, using the angle of rotation and/or the rotational speed of the motor shaft, to emit to an interface with the motor a control signal for controlling the motor.

The example embodiments described and illustrated in the figures have been chosen only as examples. Different example embodiments can be combined with one another completely or in relation to individual features. In addition one example embodiment can be supplemented by features of another example embodiment.

Furthermore, process steps according to the invention can be repeated, or carried out in a sequence other than that described.

If an example embodiment comprises an "and/or" link between a first feature and a second feature, this can be read in such manner that the example embodiment according to one version comprises both the first and the second feature, whereas according to another version it comprises either only the first feature or only the second feature.

INDEXES

- 100, 100a Control device
- 105 Motor
- 110 Motor shaft
- 111 Spindle nut
- 115, 115a Control element, threaded spindle, translational movement device
- 116 Link
- 120, 120a Sensor element
- 122 Longitudinal axis
- 125 Control range
- 300 Vehicle
- 305, 305a Steering mechanism
- 306, 306a Control element, individual control element, central control element
- 310 Axle arm
- 312 Wheel carrier
- 315 Further axle arm
- 320 Transverse control arm
- 325, 325a Control unit
- 400 Method for determining an angle of rotation and/or a rotational speed
- 405 Reading in of a movement signal
- 410 Determination of the angle of rotation and/or the rotational speed
- 500 Device for determining an angle of rotation and/or a rotational speed
- 505 Read-in unit
- 510 Determination unit
- $\alpha$ Rotation angle
- n Rotational speed
- A, B Example embodiments of the steering mechanism

The invention claimed is:

1. A method (400) of determining at least one of an angle of rotation ($\alpha$) and a rotational speed (n) of a motor shaft (110) of a motor (105), the motor (105) being designed to produce a translational movement of a control element (115) relative to the motor (105), the method (400) comprises:
   moving the control element axially along a rotational axis of the motor shaft by rotationally driving the motor shaft with the motor;
   arranging at least one sensor element outside the motor and adjacent the rotational axis of the motor shaft to detect the translational movement of the control element relative to the motor;
   reading (405) a movement signal, via an interface with the at least one sensor element (120, 120a) that is arranged outside the motor (105), and the movement signal representing the translational movement of the control element (115) relative to the motor; and
   determining (410), with a control unit, at least one of the angle of rotation ($\alpha$) and the rotational speed (n) of the motor shaft (110) from the movement signal utilizing at least one of a linear conversion, an observer structure and a Kalman filter.

2. The method (400) according to claim 1, further comprising determining a speed of the translational movement, from the movement signal, to determine the rotational speed (n) of the motor shaft in the determination step (410).

3. The method (400) according to claim 1, further comprising, during the determination step (410), at least one of using a movement equation and taking into account a transmission ratio of a mechanical transmission chain, between the motor (105) and the control element (115, 115a), for determining at least one of the angle of rotation ($\alpha$) and the rotational speed (n).

4. The method (400) according to claim 1, further comprising determining a motor shaft position, when the motor shaft (110) is at rest, and further, during the determination step (410), determining the angle of rotation ($\alpha$) using the motor shaft position.

5. The method (400) according to claim 4, further comprising acting upon the motor (105) by a test signal for determining the motor shaft position during the determination step.

6. The method (400) according to claim 4, further comprising, during the determination step, at least temporarily blocking the control element (115, 115a).

7. The method according to claim 4, further comprising receiving a position signal, via the interface with the at least one sensor element (120), and the position signal represents an absolute position of the control element (115, 115a) such that, during the determination step, a position of the motor shaft is checked using the position signal.

8. A device (500) for determining at least one of an angle of rotation ($\alpha$) and a rotational speed (n) of a motor shaft (110) of a motor (105), such that the motor (105) being designed to move a control element (115, 115a) in translation relative to the motor (105), the device (500) comprising:
   the motor shaft being rotationally driven by the motor to axially move the control element along a rotational axis of the motor shaft;
   at least one sensor element being arranged outside the motor and adjacent the rotational axis of the motor shaft to detect translational movement of the control element relative to the motor;
   a read-in unit (506) for reading in a movement signal via an interface with the at least one sensor element (120) arranged outside the motor (105), and the movement signal represents the translational movement of the control element (115, 115*a*) relative to the motor; and a determination unit (510) for determining at least one of the angle of rotation ($\alpha$) and the rotational speed (n) of the motor shaft (110), from the movement signal, utilizing at least one of a linear conversion, an observer structure and a Kalman filter.

9. A steering mechanism of a vehicle for steering either a front axle or a rear axle of the vehicle, the steering mechanism comprises:

a motor having a motor shaft that extends along a longitudinal axis, the motor driving the motor shaft to rotate about the longitudinal axis;

a control element being connected to the motor shaft such that rotation of the motor shaft about the longitudinal axis moves the control element in translation along the longitudinal axis relative to the motor, and a steering angle of the vehicle being adjusted by translational movement of the control element relative to the motor;

at least one sensor element being arranged outside the motor and adjacent the longitudinal axis for detecting the translational movement of the control element relative to the motor, the at least one sensor element emitting a movement signal, and the movement signal representing the translational movement of the control element relative to the motor; and a control unit being connected to the at least one sensor element and having a read-in unit for reading in the movement signal emitted by the at least one sensor element, and the control unit having a determination unit for determining at least one of an angle of rotation of the motor shaft and a rotational speed of the motor shaft based on the movement signal utilizing at least one of a linear conversion, an observer structure and a Kalman filter.

* * * * *